United States Patent Office.

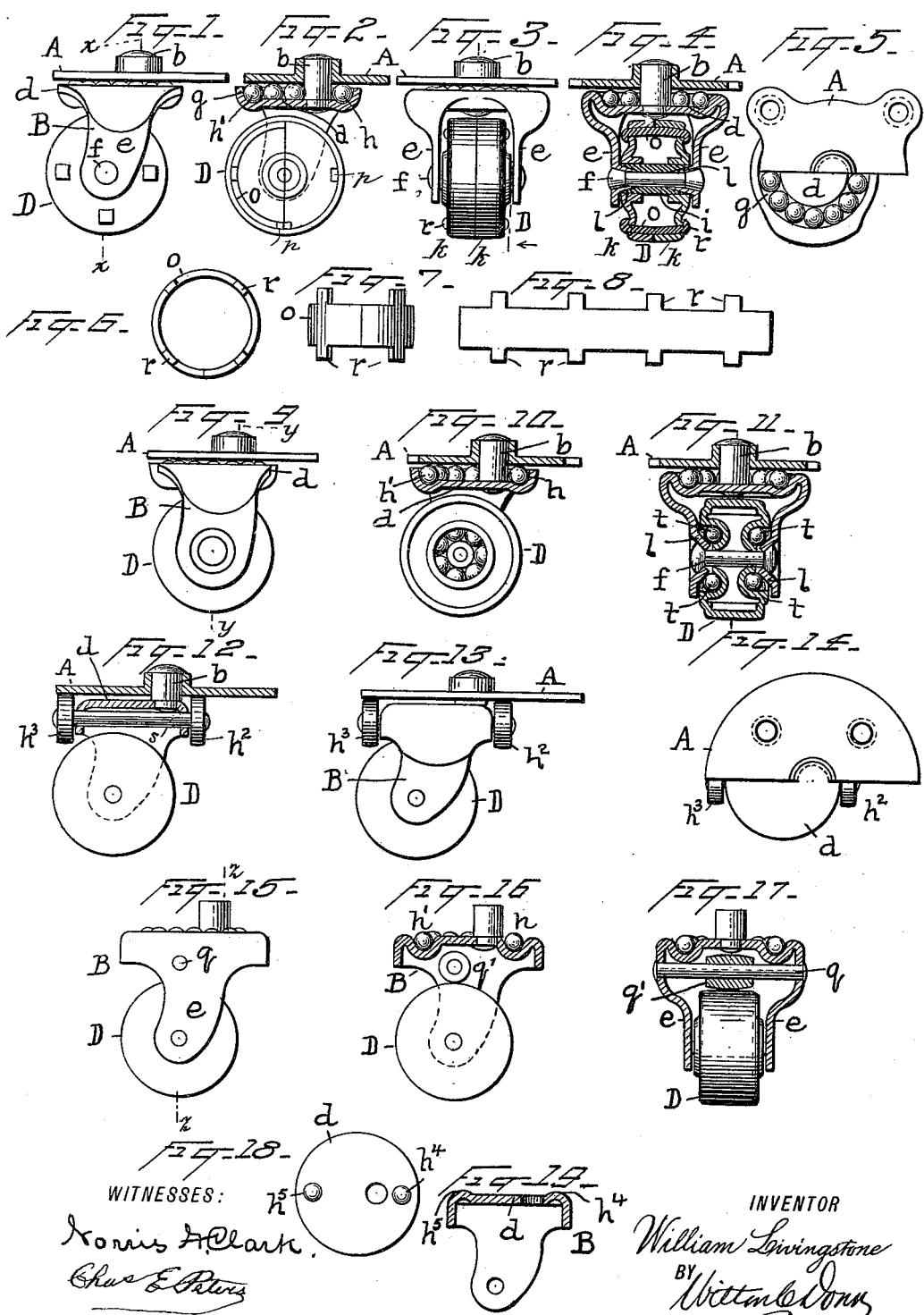

WILLIAM LIVINGSTONE, OF NEW YORK, N. Y., ASSIGNOR TO ROBERT MURRAY, TRUSTEE, OF SAME PLACE.

FURNITURE-CASTER.

SPECIFICATION forming part of Letters Patent No. 643,719, dated February 20, 1900.

Application filed July 20, 1899. Serial No. 724,507. (No model.)

*To all whom it may concern:*

Be it known that I, WILLIAM LIVINGSTONE, a citizen of the United States, residing at New York, (Flushing,) in the county of Queens and State of New York, have invented certain new and useful Improvements in Furniture-Casters; and I do hereby declare the following to be a full, clear, and exact description of the invention, such as will enable others skilled in the art to which it appertains to make and use the same.

My invention relates to improvements in that class of furniture-casters whose general principle of construction rests upon the displacement of the axis of the wheel from the perpendicular axis of the swivel-pin and commonly known as "horn-casters," as contradistinguished from ball-casters, in which the ball itself is made to rotate horizontally and vertically in a direct line with the frame or tube containing it. As to the merits of the two classes it is certain that the first has the advantages of a more sensitive action of rotation in both directions and of greater simplicity and cheapness of construction. This method of construction, however, has the disadvantage that the load or weight resting upon the caster will not exert its greatest pressure on the line of the axis of the swivel-pin as the natural axis of the caster, but upon the axis of the wheel outside thereof, and produce a canting strain, which will either force the swivel-pin out of its perpendicular and produce extreme friction at the upper end of the pin farthest from the wheel and at the lower end nearest to the wheel, as in the case of pin-casters, or this canting strain will press the upper surface of the horn or any auxiliary ball or roller bearing used for the purpose directly above the center of the wheel tightly against the upper plate or swivel-plate and loosen the contact between the same in the diametrically-opposite direction, as in the case of so-called "plate-casters." This canting strain acting during the rotation of the horn around the swivel-pin at every point of the circle it describes has the most destructive effect upon the screws which hold the swivel-plate to the furniture-leg or other object, and it is only a question of time when they will get loose and the caster fall off altogether. Another grave imperfection in the present method of construction is the shearing strain upon the wheel-pin, upon which the whole weight above the caster directly rests and makes the upper side of the hole in the horn and the lower side of the hole in the wheel form two direct-acting cutting edges against the upper and lower side of the pin, and even if the pin is strong enough to resist that shearing strain it is certain that the hole in the wheel in course of time will become elongated, its motion jerky, and finally it will not move at all. My invention contemplates the construction of a horn-caster—either pin-caster or plate-caster—which shall be free from these objections without either changing its present general appearance or making the same more complicated in construction or more expensive in price.

The geometrical principle underlying the present method of construction is a right-angled triangle one side of which is the horizontal radius from the center of the swivel-pin to the intersection of it with the perpendicular line to the center of the wheel-pin. Another is the perpendicular line from said point of intersection to the center of the wheel-pin, and the third is the hypotenuse from the center of the wheel-pin to the center of swivel-pin. The weight resting uniformly upon the horizontal side of the triangle will naturally have a tendency to force and twist and swing the hypotenuse outward and the perpendicular upward and create a point of forced contact between the horn and the swivel-plate. The rotary motion of the horn around the swivel-pin will produce a circular line of forced contact concentric with the swivel-pin.

The first object of my invention—namely, an easy, sensitive, and reliable rotary motion of the horn around the swivel-pin without any canting strain in the direction of the center of the wheel—I attain by the simple method of making the hole in the upper part or crown of the horn through which the swivel-pin is to pass not in the center of the horn, as is done now, but as near as possible to that point of its circumference farthest back from the wheel-pin, giving to the crown of the horn and to the groove forming the ball-race an eccentric form and appearance which will make the horizontal side of the triangle from the center of swivel-pin to the most forward point of contact twice as long as the horizontal distance from the center of the swivel-pin to the center of the wheel-pin, while the two other sides, from the most forward point of contact to the center of the wheel-pin and from the center of the wheel-pin to the center of the swivel-pin, are the equal sides of an isosceles triangle. All the weight pressing, therefore, upon the horizontal side of this triangle will be carried equally upon both sides of the center of the wheel without a tendency to canting or twisting.

The second object of my invention—viz., of reducing and removing the cutting and shearing strain from the wheel-pin and maintaining an easy and uniform rotary motion of the wheel—I attain by putting the weight directly upon the shanks of the horn instead of upon the wheel-pin by means that will be fully described in connection with the drawings.

The object of my invention and methods of construction as illustrated in the accompanying drawings have been preferably adapted to plate-casters; but it is to be borne in mind that they may be and are intended to be applied with equal advantage to pin-casters.

In the drawings, Figure 1 is a side elevation of a caster. Fig. 2 is a lateral section of horn, swivel-plate, and swivel-pin, showing one half of wheel with strengthening-ring and prongs and one half without it. Fig. 3 is a front elevation. Fig. 4 is a section of caster through line $x\,x$, showing conical projections of horn with surrounding tube and wheel-pin riveted against the outside of the shanks, also a section of half-wheel shells clenched together by prongs of an inner strengthening-ring. Fig. 5 is a half-plan of swivel-plate and half-plan of horn, showing eccentricity of ball-bearing. Fig. 6 is an end view, and Fig. 7 a top view, of the strengthening-ring; and Fig. 8, a blank from which the strengthening-ring with prongs is formed. Fig. 9 is an elevation, and Fig. 10 a lateral section, of swivel-plate horn and swivel-pin, with a view of the ball-bearing wheel; and Fig. 11, a section through line $y\,y$, showing construction of horn with cones on inner side of shanks and integral therewith, also construction of half-wheel shells as adapted to ball-bearings, Figs. 9, 10, and 11 being a modification of wheel and wheel-bearing as shown in Figs. 1 to 5, inclusive. Fig. 12 is a lateral section, Fig. 13 a side view, and Fig. 14 a half-plan, of swivel-plate and half-plan of horn, Figs. 12, 13, and 14 being a modification of swivel ball-bearing as shown in Figs. 1 to 5, inclusive, by substituting two rollers revolving on or with a pin for the balls moving in an eccentric groove. Fig. 15 is a side elevation, Fig. 16 a lateral section, and Fig. 17 a section, through line $z\,z$, showing pin and roller above the wheel, being a modification of the construction shown in Figs. 4 and 10 for transferring the strain to the shank of the horn above the center of the wheel-pin. Fig. 18 is a plan, and Fig. 19 a section, of a horn, being a modification of swivel-ball or roller-bearing, as shown in Figs. 1 to 5, inclusive, and 11 to 13, inclusive, by substituting semicircular or conoidal projections for the balls or rollers as bearings for the horn.

Referring to the drawings, A designates the swivel-plate of the caster, $b$ the swivel-pin, B the horn, and D the caster-wheel, in all the figures. The general form of these parts of the caster is the same as in the casters now in use.

The parts of the horn are the top or crown $d$ and the sides or shanks $e\,e$.

The swivel-pin $b$ in my caster passes through the center of the swivel-plate A, the same as in casters now in use; but it is the position of the swivel-pin $b$ in the horn which constitutes the novel feature of my invention.

On the caster illustrated by Figs. 1 to 5, inclusive, the crown of the horn contains a circular groove $g$, intended to form a ball-race the center of which is and shall be substantially indentical with the center of the horn. Assuming that this groove consists of an inner and outer and a central circle (the latter of which is the line of contact with the balls) and that the horizontal distance from the center of swivel-pin $b$ to center of wheel-pin $f$ be designated as the reach of the horn, then the central diameter of the groove $g$ will be equal to twice the reach plus one-fourth of the diameter of the swivel-pin, plus one-fourth of the diameter of the ball. The radius of this circle, less one-half the diameter of the ball and one-half the diameter of the swivel-pin, will be the exact distance of the center of the swivel-pin hole in the crown of the horn from the center of the groove $g$ on a line running through the center of the groove to the rear end of the horn B and parallel to the sides or shanks $e$ of the horn. Thus we have the distance from the center of the swivel-pin $b$ to the center of the rear ball $h$ equal to one-half of the diameter of the swivel-pin plus one-half the diameter of the ball, with just clearance enough for the ball $h$ to get past the swivel-pin $b$, while the distance from the center of the swivel-pin $b$ to the most forward ball $h'$ will be equal to the whole diameter of the central circle of the groove $g$, less the distance from center of swivel-pin to the center of rear ball $h$. The eccentricity of the groove $g$ being now established and the center of the wheel being located midway between the most forward ball $h'$ and the swivel-pin $b$, it follows naturally that the weight upon the caster must press uniformly and perpendicularly upon the center of the wheel, the canting strain will be obviated, and there will be no liability either of straining the swivel-pin or pressing the top of horn or its ball-bearing against the face of the swivel-plate.

Whatever the incidental functions of the balls which fill the groove $g$ may be, it appears to be certain that only two of them—namely, the nearest to and the farthest from the swivel-pin and diametrically opposite each other—control the effective result upon the wheel, and if by any means those balls could be confined to their normal position all the others could be dispensed with.

On the caster shown in Figs. 12 to 14, inclusive, roller-bearings are substituted for the ball-bearings and but two points of contact are made use of, both in diametrically-opposite positions corresponding to the nearest and farthermost ball $h$ and $h'$, above described. The edges of the top of the horn in this modification are turned downward, with holes through said downward projection in which a pin or shaft $s$ is made to revolve at right angles to the axis of the wheel. The two rollers $h^2$ and $h^3$, riveted onto this shaft, will revolve with it and supply the points of contact with the swivel-plate and produce a similar effect to the ball-bearing, as illustrated in Figs. 1 to 5, inclusive.

I am aware that casters have been made with double wheels, between which a roller has been made to revolve; but inasmuch as such roller was intended more as an antifriction-roller and its location was nearly perpendicular over the center of the wheels its use was far removed from the objective point of my invention. Another modification of this part of my invention is shown in Figs. 18 and 19. In this method the top of the horn is made to have two half-round or conoidal projections $h^4$ and $h^5$ in lieu of the balls or rollers, providing fixed points of contact between the crown of the horn and the swivel-plate and producing substantially the same result in the most simple and inexpensive manner.

Regarding my improvement for removing and reducing the cutting and shearing strain upon the wheel-pin, I again refer to Fig. 4 of the accompanying drawings. The sides or shanks $e\ e$ of the horn B are provided, as in casters now in use, with holes at their ends, in which the wheel-pin is riveted; but my method of making those holes consists in forcing the same through a very small hole and utilizing the material so displaced to form conical or cylindrical projections or hubs $l\ l$ on the inner sides of and integral with the shanks $e\ e$. The tube $i$, around which the wheel is to revolve, is counterbored at its ends either to fit tightly or loosely upon the said inner projections of the shanks. The pin $f$, which in ordinary casters would be the wheel-pin, passes through the holes in the shanks and their surrounding projections, as well as through the tube $i$, and is riveted against the outside of the shanks. If the tube $i$ be fitted tight against the projections $l\ l$, the riveting of the pin will produce a solid fixed bearing for the wheel to revolve upon, being much stronger, because the tube $i$, surrounding the pin, forms to all intents and purposes a solid connection between the shanks and projections and the tube and the pin. On the other hand, if the tube $i$ be fitted so as to turn upon the projections $l\ l$ the riveting of the pin without tightening the tube against the inner sides of the shanks will give to the wheel a rolling motion upon the rolling-tube. In either case the weight above the caster pressing primarily upon the shanks and their projections will absorb all or most of the strain before the effect thereof could be felt by the wheel or tube $i$, and least of all by the pin $f$.

The wheel D itself consists of two half shells or cups $k\ k$, exactly alike, and an inner strengthening-ring $o$, Figs. 6 and 7. On the sides of these cups, next to the inner rims thereof, are a number (preferably four) of rectangular perforations $p\ p\ p\ p$. The ring $o$ is made from a strip of metal, Fig. 8, of the proper width to fit accurately between the two cups when put together and has prongs $r\ r\ r\ r$ on its two edges corresponding to the perforations in the cups, so that when the latter are put together the ring will be forced in one cup until the prongs pass through the perforations, when the other cup will be forced upon the ring until the prongs pass through the perforations and the edges of the two cups come close together, when the prongs projecting through the perforations of both cups are clenched against the outer sides thereof.

Figs. 10 and 11 show a modification of the above method for reducing and removing the strain upon the wheel-pin, which will produce a very superior caster. The conical projections $l\ l$ on the inner sides of the shanks $e\ e$ are made to an angle of forty-five degrees, more or less, to the face of the shanks, so as to form proper cones for ball-bearings, while the cups which shall form the wheel are so shaped as to provide proper recesses on their sides to form a ball-race and to secure the balls $t$ in it by suitable ball-retainers. Inasmuch as by this method the weight upon the caster will act directly upon the cones $l\ l$ and balls $t$, there is no necessity for the tube $i$, and the pin $f$ being riveted against the indentations in the shanks will secure the proper distance between the cones, balls, and ball-races. The inner strengthening-ring may or may not be used, as both cups being pressed and held together by the balls and cones in fixed lateral position they cannot separate. Another modification for the same purpose is shown in Figs. 15, 16, and 17. The pin $q$ passes through the upper part of the shanks $e$ in a line parallel to the axis of the wheel and carries a roller $q'$, the under face of which will just touch the upper face of the wheel, whereby the strain will be borne by the shanks through the intermediate pin $q$ and the roller $q'$.

I claim—

1. In a furniture-caster a horn having its top hung on a swivel-pin at a point removed from the true center of the top, and bearing-points in the same horizontal plane between the horn and the swivel-plate equally distant from the true center of the top of the horn but unequally distant from the swivel-pin the most forward of said bearing-points and the swivel-pin being equidistant from a perpendicular line drawn through the axis of the caster-wheel substantially as specified.

2. In a furniture-caster the combination with the caster-wheel and its pin, of a caster-horn or wheel-hanger having perforated conical projections on the inner sides of and integral with the shanks, through which the caster-wheel pin is passed and its end riveted therein on the outside, substantially as specified.

3. In a furniture-caster the combination with the caster-wheel, of a caster-horn or wheel-hanger, having perforated conical projections on the inner sides of and integral with the shanks thereof, a tube having counterbored ends to fit over the said conical projections, and a pin passing through the perforated conical projections of the shanks and the tube and riveted on the outside of the shanks, substantially as described.

4. In a furniture-caster, the combination of a swivel-plate, a swivel-pin, a caster-wheel, a caster-wheel horn hung on the swivel-pin at a point removed from the true center thereof, bearing-points between the top of the horn and the swivel-plate, one of the said bearing-points and the swivel-pin being on opposite sides of a perpendicular line drawn through the axis of the caster-wheel pin, and a bearing mounted on a shaft within the horn, the axes of the said bearing-wheel and the caster-wheel being in the same vertical plane, substantially as specified.

In testimony that I claim the invention above set forth I do affix my signature in presence of two witnesses.

WILLIAM LIVINGSTONE.

Witnesses:
  FREDK. HAYNES,
  WILTON C. DONN.